(12) United States Patent
Kim et al.

(10) Patent No.: US 11,089,571 B2
(45) Date of Patent: Aug. 10, 2021

(54) METHOD FOR PERFORMING A RAN BASED PAGING AND DEVICE SUPPORTING THE SAME

(71) Applicant: LG Electronics Inc., Seoul (KR)

(72) Inventors: Seokjung Kim, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/634,515

(22) PCT Filed: Aug. 6, 2018

(86) PCT No.: PCT/KR2018/008872
§ 371 (c)(1),
(2) Date: Jan. 27, 2020

(87) PCT Pub. No.: WO2019/027296
PCT Pub. Date: Feb. 7, 2019

(65) Prior Publication Data
US 2020/0178208 A1 Jun. 4, 2020

Related U.S. Application Data

(60) Provisional application No. 62/541,120, filed on Aug. 4, 2017.

(51) Int. Cl.
*H04W 68/02* (2009.01)
*H04W 76/15* (2018.01)
*H04W 76/27* (2018.01)

(52) U.S. Cl.
CPC .......... *H04W 68/02* (2013.01); *H04W 76/15* (2018.02); *H04W 76/27* (2018.02)

(58) Field of Classification Search
CPC ...... H04W 68/02; H04W 75/15; H04W 75/27
USPC ........................................................ 455/458
See application file for complete search history.

(56) References Cited

U.S. PATENT DOCUMENTS

2013/0182677 A1  7/2013  Frenger et al.
2016/0309449 A1  10/2016  Diachina et al.

OTHER PUBLICATIONS

LG Electronics Inc., "Paging response to CN paging in RRC_INACTIVE", R2-1704546, 3GPP TSG-RAN WG2 Meeting #98, Hangzhou, China, May 15-19, 2017, 2 pages.
LG Electronics Inc., "Procedure details related to RRC_INACTIVE", R2-1704543, 3GPP TSG-RAN WG2 Meeting #98, Hangzhou, China, May 15-19, 2017, 5 pages.
LG Electronics, "Paging design in NR", R1-1707592, 3GPP TSG RAN WG1 Meeting #89, Hangzhou, China, May 15-19, 2017, 5 pages.

*Primary Examiner* — Joel Ajayi
(74) *Attorney, Agent, or Firm* — Fish & Richardson P.C.

(57) ABSTRACT

Provided are a method of performing a RAN based paging a device supporting the method. According to one embodiment of the present disclosure, a method for performing a RAN based paging in a wireless communication system includes: receiving a message, which includes paging related information and information indicating that a user equipment (UE) enters a radio resource control (RRC) inactive state, from a master node (MN); receiving a downlink (DL) data from a core network; and performing the RAN based paging for the UE by using the paging related information.

13 Claims, 14 Drawing Sheets

METHOD FOR PERFORMING A RAN BASED PAGING AND DEVICE SUPPORTING THE SAME

CROSS-REFERENCE TO RELATED APPLICATIONS

This application is a National Stage application under 35 U.S.C. § 371 of International Application No. PCT/KR2018/008872, filed on Aug. 6, 2018, which claims the benefit of U.S. Provisional Application No. 62/541,120 filed on Aug. 4, 2017. The disclosures of the prior applications are incorporated by reference in their entirety.

TECHNICAL FIELD

The present invention relates to a wireless communication system, and more particularly, to a method in which a secondary node (SN) in dual connectivity (DC) performs a RAN based paging without assistance of master node (MN), and a device supporting the same.

BACKGROUND

Efforts have been made to develop an improved 5$^{th}$-generation (5G) communication system or a pre-5G communication system in order to satisfy a growing demand on radio data traffic after commercialization of a 4$^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, Multi-RAT Dual Connectivity (MR-DC) is a generalization of the Intra-E-UTRA Dual Connectivity (DC), where a multiple Rx/Tx UE may be configured to utilise resources provided by two different nodes connected via non-ideal backhaul, one providing E-UTRA access and the other one providing NR access. One node acts as the MN and the other as the SN. The MN and SN are connected via a network interface and at least the MN is connected to the core network. MR-DC is designed based on the assumption of non-ideal backhaul between the different nodes but can also be used in case of ideal backhaul. All MR-DC normative text and procedures in this version of the specification show the aggregated node case.

SUMMARY

According to a prior art, how to basically support the RAN paging triggered by the secondary node (SN) when the downlink data is arrived at the SN is not clarified. Further it is needed to determine how to support the UE's request for the RRC connection resumption at the SN.

According to an embodiment of present invention, a method for performing, by a secondary node (SN) in dual connectivity (DC), a radio access network (RAN) based paging in a wireless communication system is provided. The method may comprise: receiving a message, which includes paging related information and information indicating that a user equipment (UE) enters a radio resource control (RRC) inactive state, from a master node (MN); receiving a downlink (DL) data from a core network; and performing the RAN based paging for the UE by using the paging related information.

The UE may be located in a coverage of the SN.

The paging related information may include at least one of UE identity index value, UE paging identity, paging discontinuous reception (DRX), radio access network (RAN) paging area, paging priority and assistance data for paging.

A user plane connection between the core network and the SN may be maintained, while the UE is in RRC inactive state.

A control plane connection and a user plane connection between the core network and the MN may be maintained, while the UE is in RRC inactive state.

The method may further comprise: transmitting a notification of the DL data to the MN.

The paging related information may include a security information for a verification of the UE.

The method may further comprise: verifying the UE by using the security information, upon receiving the DL data from the core network.

The method may further comprise: receiving a request for a RRC connection from the UE, when the UE is paged by the paging; configuring radio resource for the RRC connection; and transmitting resume request including information on the configured radio resources to the MN.

The resume request may include at least one of signaling radio bearer (SRB) identity (ID) or data radio bearer (DRB) ID admitted and rejected by the SN, updated radio link control (RLC) configuration and updated logical channel configuration.

The method may further comprise: receiving a resume response including information on radio resource configured by the MN based on the resume request; and reconfiguring the radio resource for the RRC connection.

The resume response may include at least one of SRB ID or DRB ID admitted and rejected by the MN, updated RLC configuration and Updated Logical channel configuration.

The method further comprise: resuming radio bearers based on the reconfigured radio resource.

According to another embodiment of present invention, a secondary node (SN) in dual connectivity (DC) in a wireless communication system is provided. The SN may comprise: a transceiver for transmitting or receiving a radio signal; and a processor coupled to the transceiver, the processor configured to: receive a message including paging related information and information indicating that a user equipment (UE) enters a radio resource control (RRC) inactive state, from a master node (MN); receive a downlink (DL) data from a core network; and perform a radio access network (RAN) based paging for the UE by using the paging related information.

According to embodiments of present invention, the SN may efficiently trigger the RAN paging procedure to find the UE in the RRC-INACTIVE state (or light connection in LTE). In addition, the SN may efficiently resume the RRC connection for the UE since the UE needs not to re-access to the MN to request the resumption of the RRC connection. Therefore, this embodiments of present invention may make the UE's experience better (e.g. state transition from the RRC-INACTIVE state (or light connection in LTE) to the RRC-CONNECTED state).

DETAILED DESCRIPTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
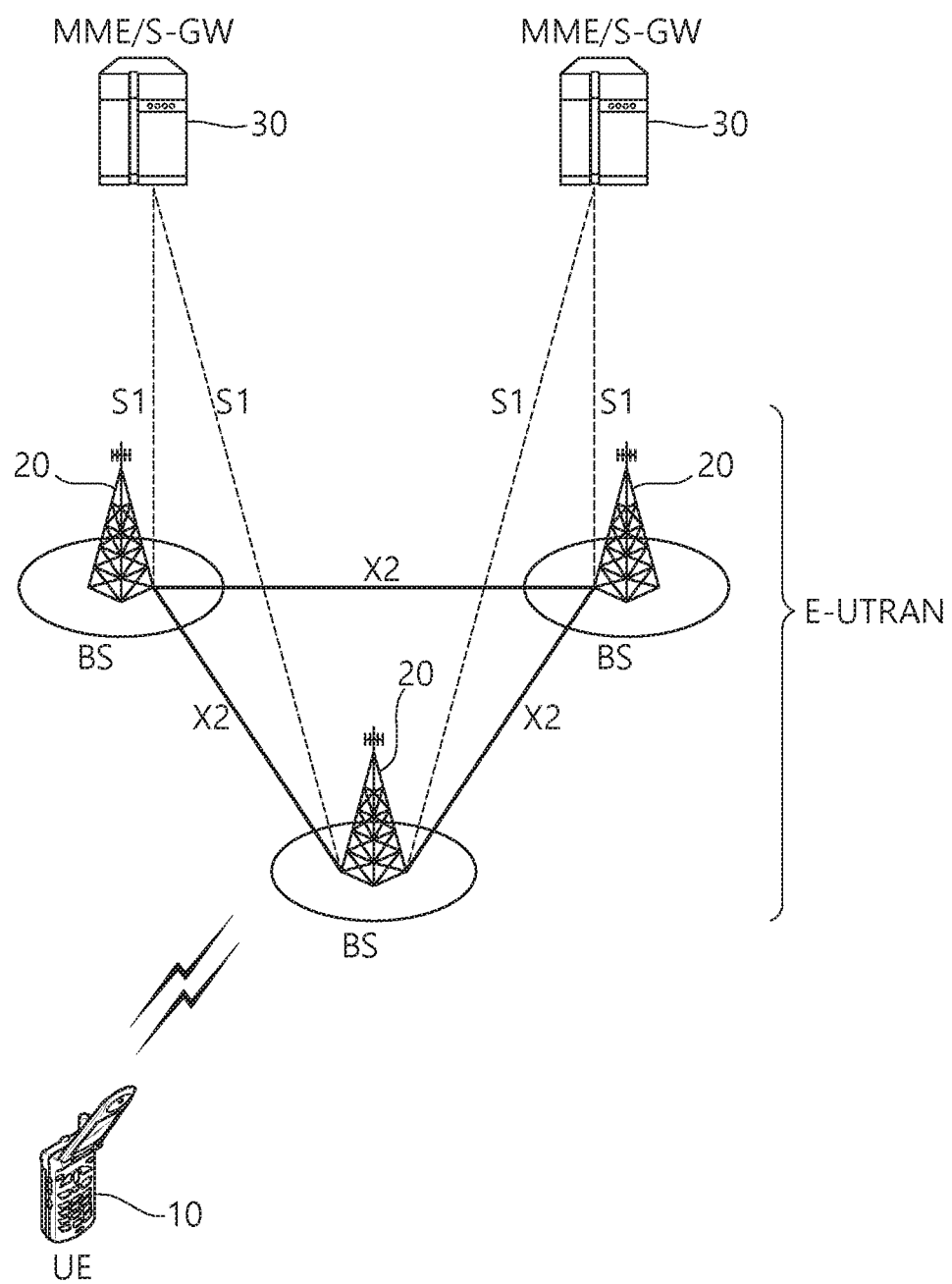
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
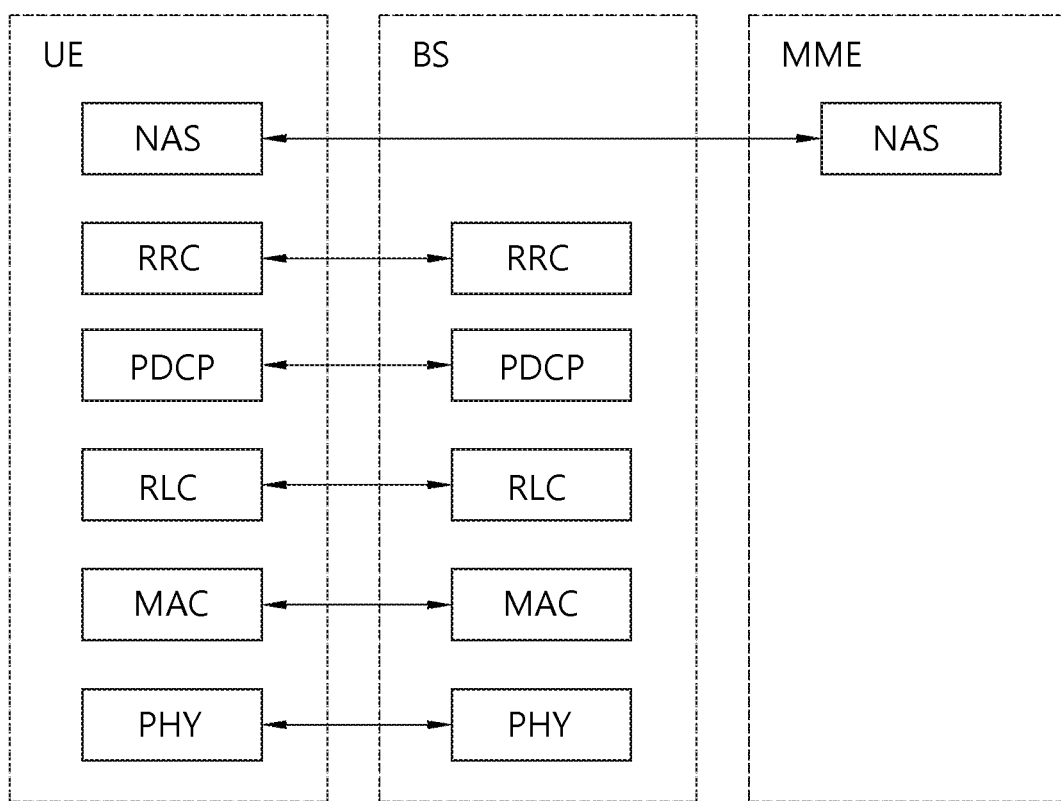
FIG. 2 shows a block diagram of a control plane protocol stack of an LTE system.
Figure 3:
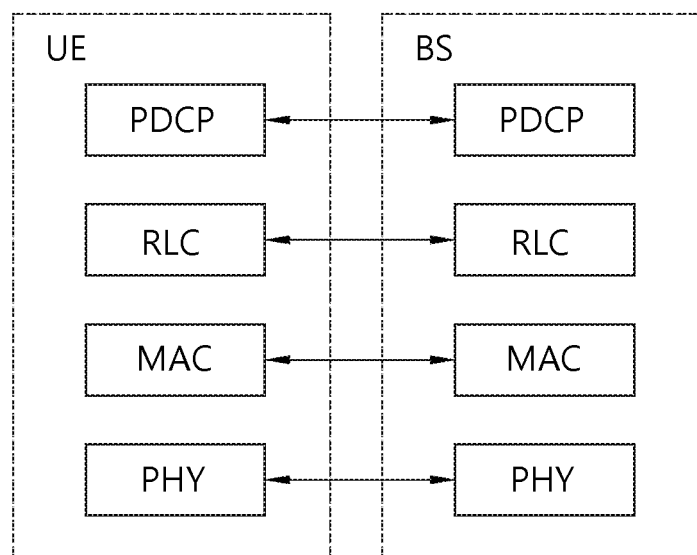
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a 5G network structure is described.

Figure 4:
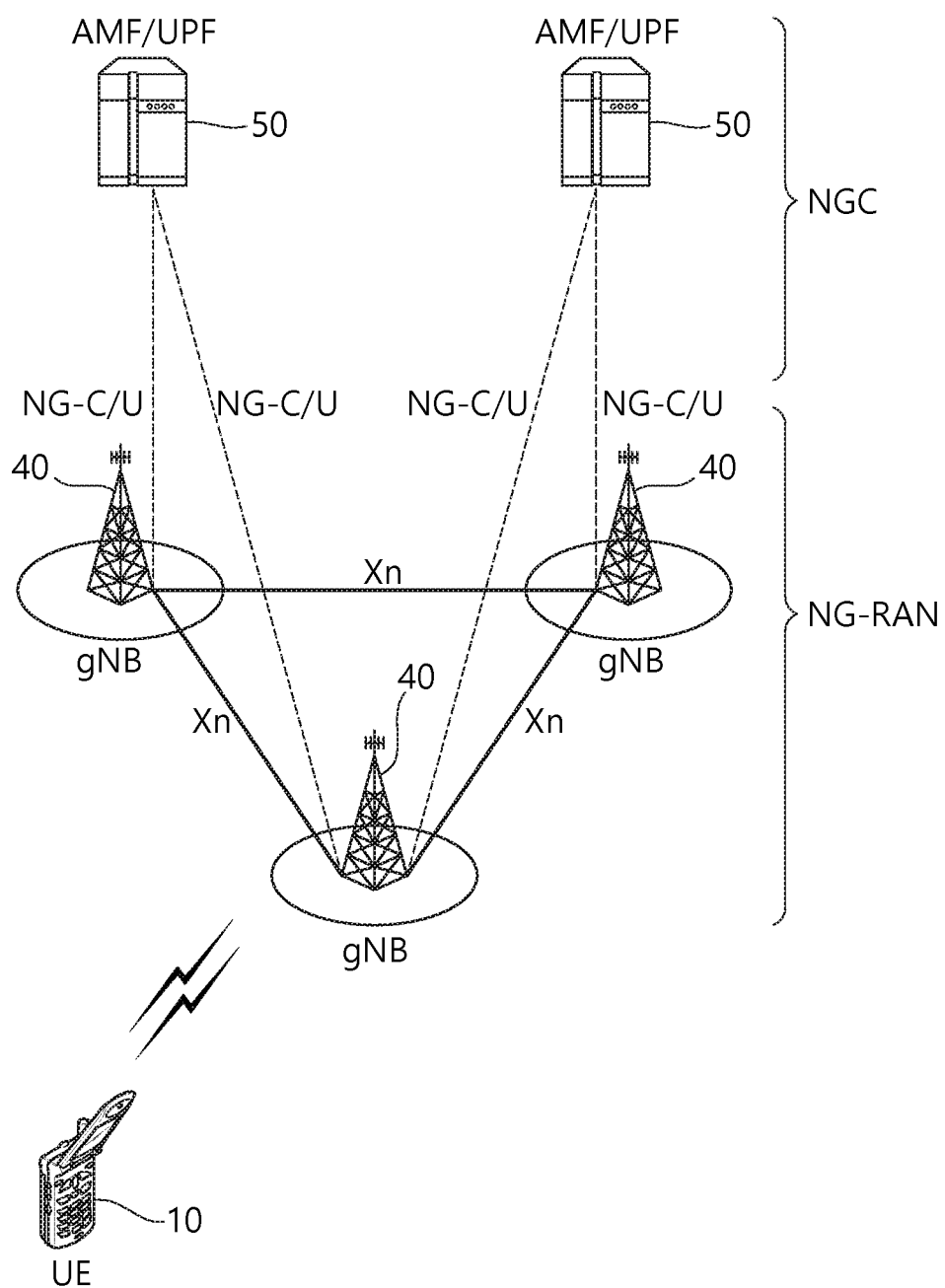
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF).

That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

Figure 5:
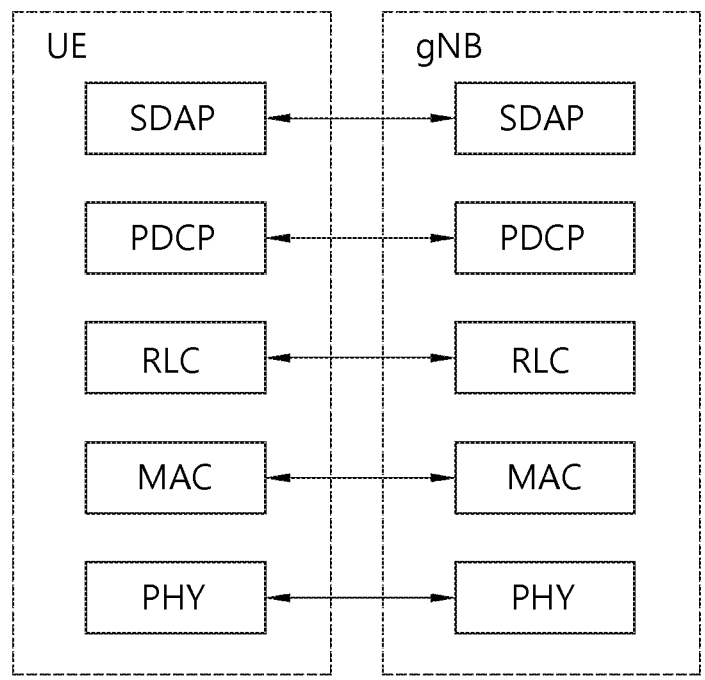
FIG. 5 shows the radio interface protocol for the user plane of the 5G system.

FIG. 5 shows the radio interface protocol for the user plane of the 5G system.

Referring to FIG. 5, the radio interface protocol of the 5G system with respect to the user plane may include a new layer called Service Data Adaptation Protocol (SDAP) as compared with the LTE system. The main services and functions of the SDAP layer are the mapping between the Quality of Service (QoS) flow and the data radio bearer (DRB), and the QoS flow ID (QFI) marking in both DL and UL packets. The single protocol entity of the SDAP can be configured for each individual PDU session, except for the DC (dual connectivity) where two entities can be configured.

Multi-RAT Dual Connectivity with 5GC is Described.

Multi-RAT Dual Connectivity (MR-DC) is a generalization of the Intra-E-UTRA Dual Connectivity (DC), where a multiple Rx/Tx UE may be configured to utilise resources provided by two different nodes connected via non-ideal backhaul, one providing E-UTRA access and the other one providing NR access. One node acts as the MN and the other as the SN. The MN and SN are connected via a network interface and at least the MN is connected to the core network. MR-DC is designed based on the assumption of non-ideal backhaul between the different nodes but can also be used in case of ideal backhaul.

NG-RAN supports NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface.

NG-RAN supports NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

In MR-DC, the UE has a single RRC state, based on the MN RRC and a single C-plane connection towards the Core Network. Each radio node has its own RRC entity (E-UTRA version if the node is an eNB or NR version if the node is a gNB) which can generate RRC PDUs to be sent to the UE.

RRC PDUs generated by the SN can be transported via the MN to the UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

In EN-DC, at initial connection establishment SRB1 uses E-UTRA PDCP. After initial connection establishment MCG SRBs (SRB1 and SRB2) can be configured by the network to use either E-UTRA PDCP or NR PDCP. A PDCP version change (release of old PDCP and establish of new PDCP) of SRBs can be supported in either direction (i.e. from E-UTRA PDCP to NR PDCP or viceversa) via a handover procedure (reconfiguration with mobility) or, for the initial change from E-UTRA PDCP to NR PDCP, with a reconfiguration without mobility, when the network knows there is no UL data in buffer and before the initial security activation. For EN-DC capable UEs, NR PDCP can be configured for DRBs and SRBs also before EN-DC is configured.

If the SN is a gNB (i.e. for EN-DC and NGEN-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB is supported for all MR-DC options, allowing duplication of RRC PDUs generated by the MN, via the direct path and via the SN. Split SRB uses NR PDCP. This version of the specification does not support the duplication of RRC PDUs generated by the SN via the MN and SN paths.

In EN-DC, the SCG configuration is kept in the UE during suspension. The UE releases the SCG configuration (but not the radio bearer configuration) during resumption initiation.

In MR-DC, from a UE perspective, three bearer types exist: MCG bearer, SCG bearer and split bearer.

For EN-DC, the network can configure either E-UTRA PDCP or NR PDCP for MN terminated MCG bearers while NR PDCP is always used for all other bearers.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN.

Figure 6:
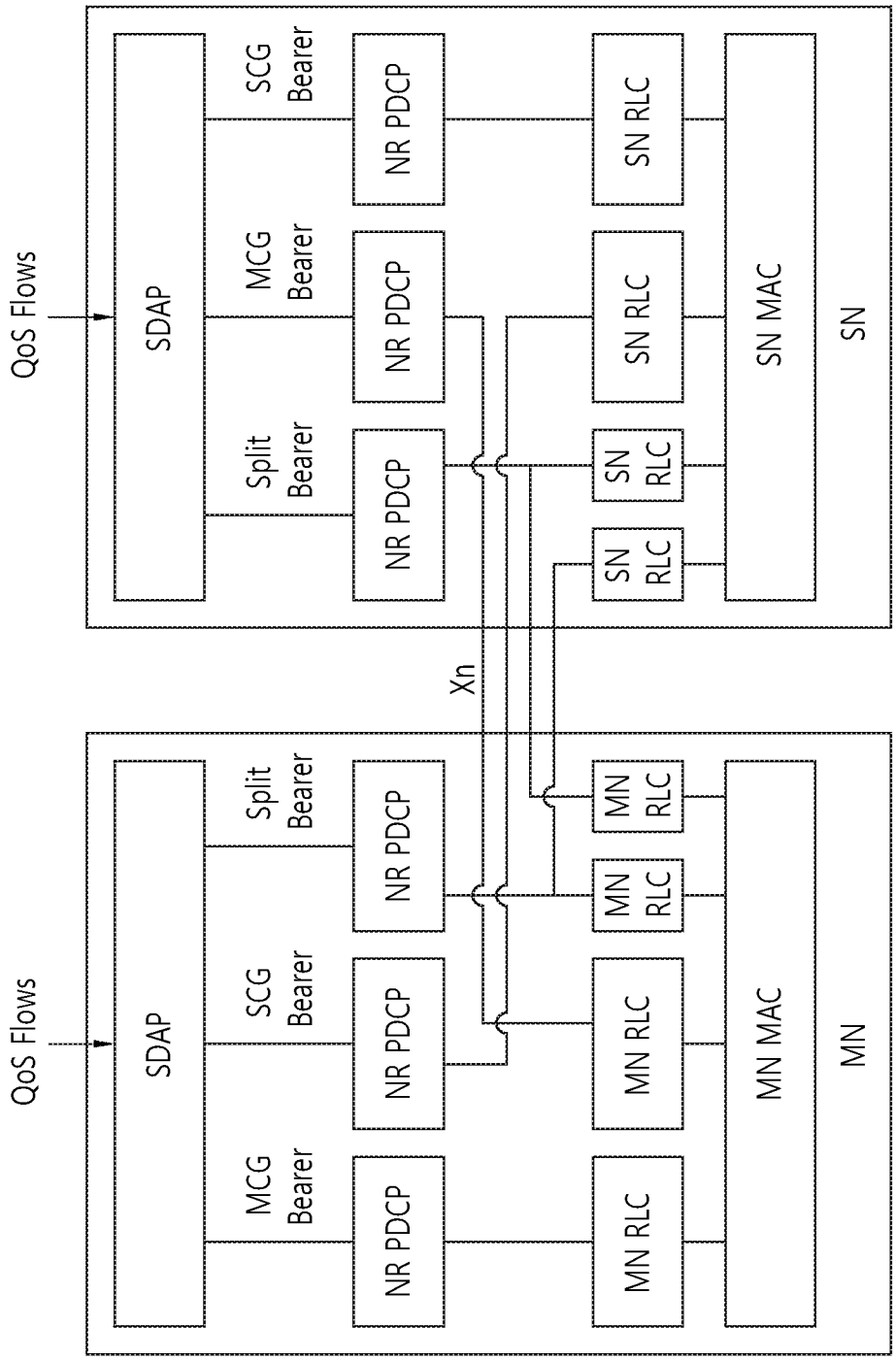
FIG. 6 illustrates a radio protocol architecture in MR-DC with 5GC.

FIG. 6 illustrates a radio protocol architecture in MR-DC with 5GC. From a network perspective, each bearer (MCG, SCG and split bearer) can be terminated either in MN or in SN. Referring FIG. 6, Network side protocol termination options for MR-DC with 5GC (NGEN-DC, NE-DC) are illustrated. Even if only SCG bearers are configured for a UE, for SRB1 and SRB2 the logical channels are always configured at least in the MCG, i.e. this is still an MR-DC configuration and a Pcell always exists. If only MCG bearers are configured for a UE, i.e. there is no SCG, this is still considered an MR-DC configuration, as long as at least one of the bearers is terminated in the SN.

Hereinafter, a method for performing RAN based paging according to an embodiment of present invention is described.

In MR-DC with 5GC, how to basically support the RAN paging triggered by the secondary node (SN) when the downlink data is arrived at the SN is not clarified.

Further it is needed to determine how to support the UE's request for the RRC connection resumption at the SN. The embodiments on present invention are related to supporting efficiently the RAN paging and Resume procedure at the SN for the successful resumption of the RRC connection in Multi-RAT Dual Connectivity (MR-DC) considering the RRC-INACTIVE state.

According to an embodiment of present invention, the SN may efficiently trigger the RAN paging procedure to find the UE in the RRC-INACTIVE state (or light connection in LTE). In addition, the SN may efficiently resume the RRC connection for the UE since the UE needs not to re-access to the MN to request the resumption of the RRC connection. Therefore, this embodiments of present invention may make the UE's experience better (e.g. state transition from the RRC-INACTIVE state (or light connection in LTE) to the RRC-CONNECTED state). In this description, a RAN based paging may be described as paging or RAN paging.

Figure 7:
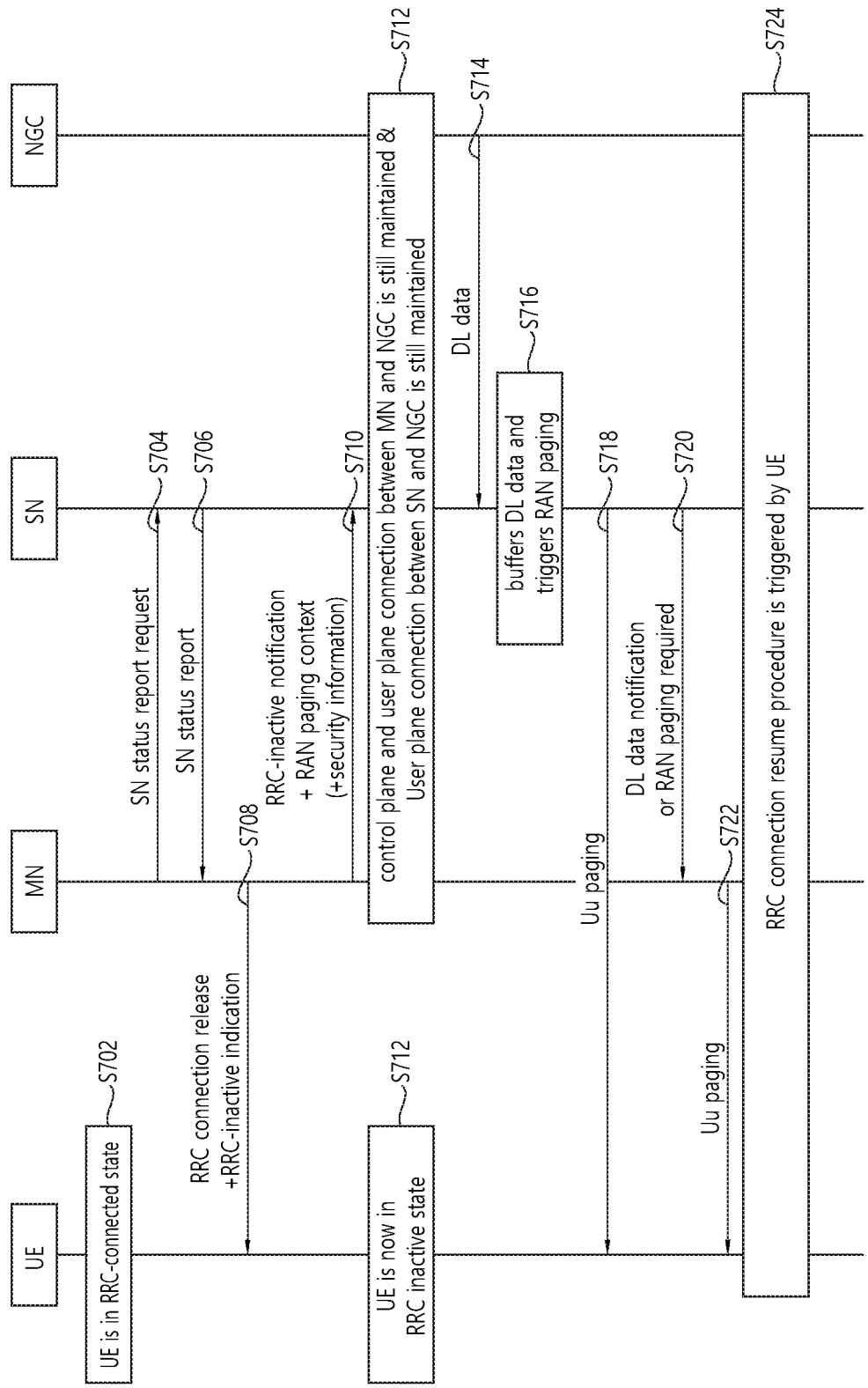
FIG. 7 shows an example of a method for performing RAN based paging according to an embodiment of the present invention.

FIG. 7 shows an example of a method for performing RAN based paging according to an embodiment of the present invention. For the case where the master node (MN) decides to transit the UE's state to the RRC-INACTIVE, the MN may send the RAN paging context when it indicates to the SN the UE enters into the RRC-INACTIVE state. This RAN paging context may help the SN immediately trigger the Paging procedure when the downlink data is arrived at the SN. In order for the SN to verify the UE identity without the help of the MN during the RRC Connection Resume procedure, the MN may also provide to the SN the security information to calculate the authentication token.

Referring FIG. 7, a method for RAN paging triggered by SN in MR-DC considering RRC-INACTIVE state according to an embodiment of the present invention is described. In this embodiment, it is assumed that the UE is located in coverage of SN.

In Step S702, a UE may be in RRC-CONNECTED state as an initial condition.

In Step S704, before the UE enters the RRC-INACTIVE state, the MN may send to the SN the SN STATUS REPORT REQUEST message or new message to check the bearer activity in the SN.

In Step S706, on receiving the message from the MN, the SN may respond to the MN with the SN STATUS REPORT message or new message to indicate that the SN does not have a downlink or uplink data to be sent.

In Step S708, because of the user inactivity, the MN decides to transit the UE's state to the RRC-INACTIVE. Therefore, the MN may send to the UE the RRC CONNECTION RELEASE message or new message. This message may include the RRC-inactive indication to notify the UE of transiting to the RRC-INACTIVE state.

In Step S710, the MN also may send to the SN the RRC-INACTIVE NOTIFICATION message or new message to indicate that the UE enters the RRC-INACTIVE state. The MN may provide RAN paging related information to SN, so that the SN may perform RAN paging the UE directly when the SN receives DL data. This message may include the following RAN paging context:

UE identity index value
UE paging identity
Paging DRX
RAN paging area
Paging priority
Assistance data for paging Based on this information, the SN may perform the paging over the Uu interface to find the UE when the downlink data is arrived at the SN. If the MN provides to the SN the security information to calculate the authentication token in this step, the SN may use this information to verify the UE identity without the help of the MN during the RRC Connection Resume procedure.

In Step S712, upon reception of the RRC CONNECTION RELEASE message or new message including the RRC-inactive indication, the UE may enter the RRC-INACTIVE state. The control plane and user plane connection between the MN and NGC may be still maintained. Also, the user plane connection between the SN and NGC may be maintained.

In Step S714, the NGC may transmit the downlink data to the SN by using the SCG bearer or SCG split bearer.

In Step S716, when the SN receives the downlink data from the NGC, the SN may buffer the data and trigger the Paging procedure to find the UE. That is, the SN may trigger paging procedure with the information, such as RAN paging context, which the SN received from MN already.

In Step S718, the SN may send to the UE the PAGING message or new message over the Uu interface.

In Step S720, the SN also may send to the MN the DOWNLINK DATA NOTIFICATION message or RAN PAGING REQUIRED message or new message to indicate that the downlink data is received at the SN.

In Step S722, on receiving the message from the SN, the MN may trigger the RAN Paging procedure to find the UE in the RAN based notification area. The MN may also send to the UE the PAGING message or new message over the Uu interface.

In Step S724, on receiving the PAGING message, the UE may initiate the UE triggered RRC Connection Resume procedure.

According to an embodiment of present invention, when the SN receives the downlink data to be sent to the UE, the SN can immediately trigger the RAN Paging procedure to find the UE without the help of the MN.

Figure 8:
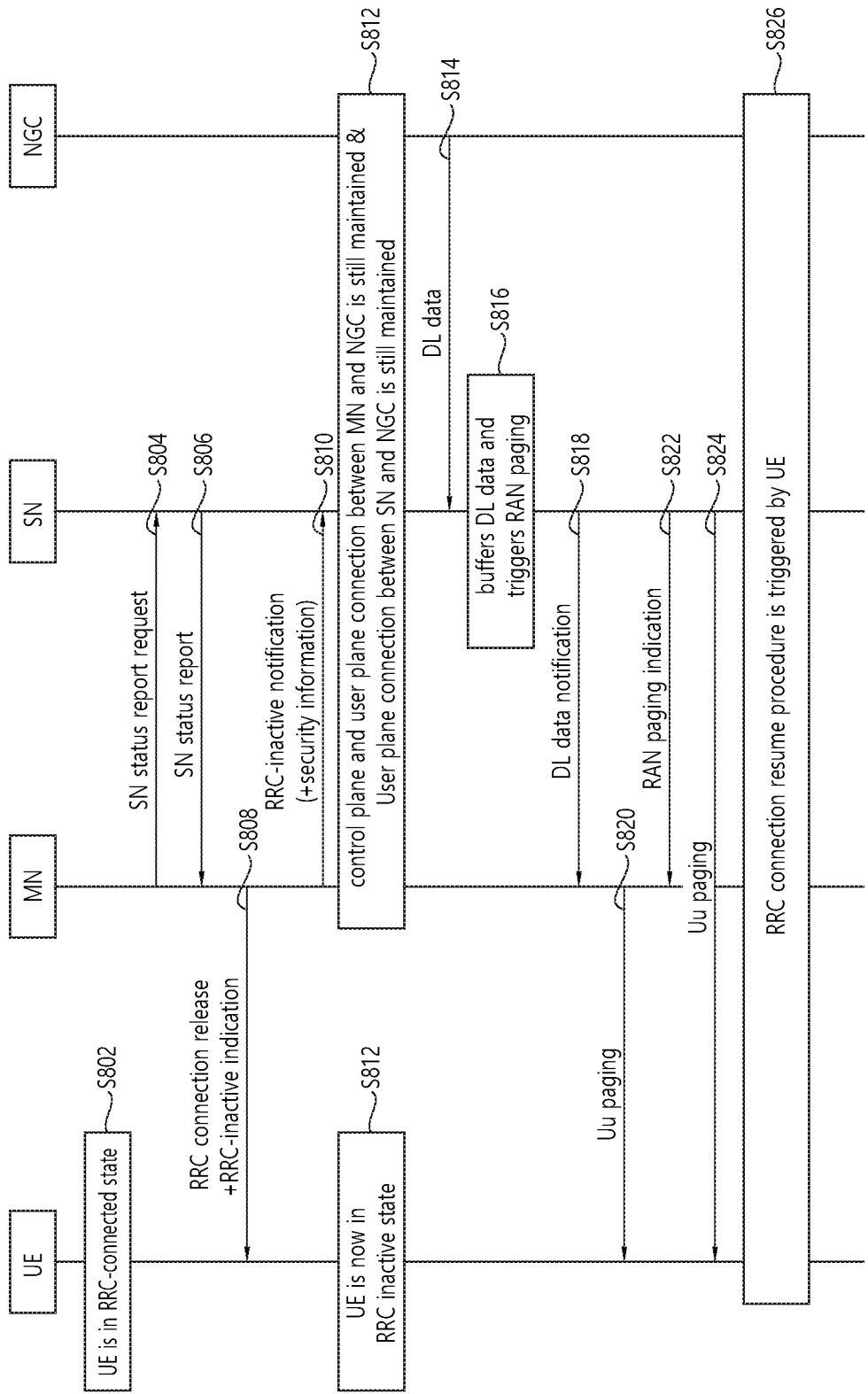
FIG. 8 shows an example of a method for performing RAN based paging according to an embodiment of the present invention.

FIG. 8 shows an example of a method for performing RAN based paging according to an embodiment of the present invention. For the case where the MN decides to transit the UE's state to the RRC-INACTIVE, the MN may send the security information to calculate the authentication token when it indicates to the SN the UE enters into the RRC-INACTIVE state. This information enables the SN to verify the UE identity without the help of the MN during the RRC Connection Resume procedure. When the SN receives the downlink data to be sent to the UE, the SN may send to the MN the DOWNLINK DATA NOTIFICATION message to request the paging related information to trigger the PAGING message over the Uu interface at the SN.

Referring FIG. 8, a method for RAN paging triggered by SN in MR-DC considering RRC-INACTIVE state according to an embodiment of the present invention is described. In this embodiment, it is assumed that the UE is located in coverage of SN.

In Step S802, the UE may be in RRC-CONNECTED state as an initial condition.

In Step S804, before the UE enters the RRC-INACTIVE state, the MN may send to the SN the SN STATUS REPORT REQUEST message or new message to check the bearer activity in the SN.

In Step S806, on receiving the message from the MN, the SN may respond to the MN with the SN STATUS REPORT message or new message to indicate that the SN does not have a downlink or uplink data to be sent.

In Step S808, because of the user inactivity, the MN may decide to transit the UE's state to the RRC-INACTIVE. Therefore, the MN may send to the UE the RRC CONNECTION RELEASE message or new message. This message may include the RRC-inactive indication to notify the UE of transiting to the RRC-INACTIVE state.

In Step S810, the MN also may send to the SN the RRC-INACTIVE NOTIFICATION message or new message to indicate that the UE enters the RRC-INACTIVE state. The MN may provide to the SN the security information to calculate the authentication token. Thus, the SN may use the security information to verify the UE identity without the help of the MN during the RRC Connection Resume procedure.

In Step S812, upon reception of the RRC CONNECTION RELEASE message or new message including the RRC-inactive indication, the UE may enter into the RRC-INACTIVE state. The control plane and user plane connection between the MN and NGC may be still maintained. Also, the user plane connection between the SN and NGC may be maintained.

In Step S814, the NGC may transmit the downlink data to the SN by using the SCG bearer or SCG split bearer.

In Step S816, when the SN receives the downlink data from the NGC, the SN may buffer the data and trigger the Downlink Data Notification procedure to the MN. The SN may verify the UE by using the security information received in Step S810 from the MN.

In Step S818, the SN may send to the MN the DOWNLINK DATA NOTIFICATION message or new message to indicate that since the downlink data is received at the SN. The SN may require the paging related information to perform the RAN paging.

In Step S820, on receiving the message from the SN, the MN may trigger the RAN Paging procedure to find the UE in the RAN based notification area. The MN may also send to the UE the PAGING message or new message over the Uu interface.

In Step S822, the MN also may send to the SN the RAN PAGING INDICATION message or new message to forward the following RAN paging context:
UE identity index value
UE paging identity
Paging DRX
RAN paging area
Paging priority
Assistance data for paging In Step S824, the SN may perform the RAN paging over the Uu interface to find the UE based on the RAN paging context included in the RAN PAGING INDICATION message.

In Step S826, on receiving the PAGING message, the UE may initiate the UE triggered RRC Connection Resume procedure.

According to an embodiment of present invention, when the SN receives the downlink data to be sent to the UE, the SN can efficiently acquire the paging related information to trigger the RAN Paging procedure with the help of the MN. Specifically, the MN does not need to provide all information for RAN based paging when UE enters the RRC inactive state (in step S810). On the other hand, the SN may request rest of information for RAN based paging after the SN determined to perform RRC connection resume procedure.

Figure 9:
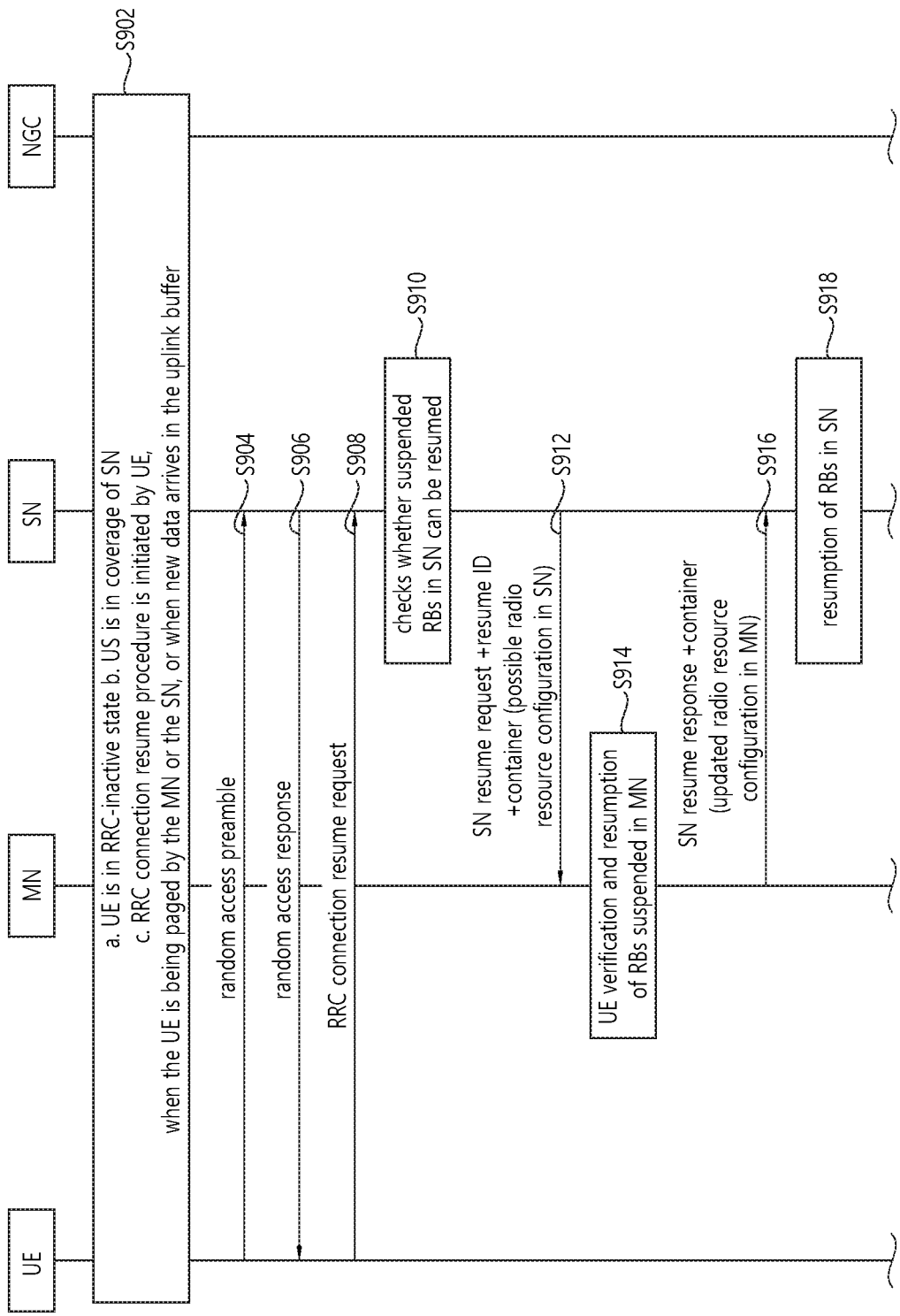
FIG. 9 shows an example of a method for performing RAN based paging according to an embodiment of the present invention.

FIG. 9 shows an example of a method for performing RAN based paging according to an embodiment of the present invention. For the case where the UE needs to initiate the RRC Connection Resume procedure to the SN, the SN may ask to the MN whether to resume the RRC connection for that UE. In order to assist the UE verification in the MN, the SN also may send to the MN which suspended RBs in the SN can be resumed. After the UE verification, the MN also may indicate to the SN that the UE identity is valid and which suspended RBs in the MN can be resumed. Based on this information, the SN may send to the UE that the resumption for the suspended RRC connection is permitted and the RBs for the MN and SN needs to be reconfigured at the UE.

Referring FIG. 9, a method for successful RRC connection resume to the SN in the MR-DC considering the RRC-INACTIVE state according to an embodiment of the present invention is described.

In Step S902, the UE may be in the RRC-INACTIVE state as an initial condition. Also, the control plane and user plane connection between the MN and NGC may be still maintained. Also, the user plane connection between the SN and NGC may be maintained. The UE may be located within the coverage of the SN. When the UE is being paged by the MN or the SN, or when new data arrives in the uplink buffer, the UE may initiate the UE triggered RRC Connection Resume procedure in order to resume the RRC connection.

In Step S904, when the UE in RRC-INACTIVE state needs to transit to the RRC-CONNECTED state, the UE first may send the RANDOM ACCESS PREAMBLE message or new message to the SN.

In Step S906, on receiving the message from the UE, the SN may respond with RANDOM ACCESS RESPONSE message to the UE.

In Step S908, in order to resume the RRC connection, the UE may send the RRC CONNECTION RESUME REQUEST message or new message to the SN. This message also includes the Resume ID and short MAC-I to identify the UE context in the SN and MN.

In Step S910, when the SN successes to access the previously stored UE context based on the Resume ID, the SN may check whether the suspended RBs in the SN can be resumed or not. When the MN provides the security information to calculate the authentication token during the UE's state transition from the RRC-CONNECTED to the RRC-INACTIVE, the SN may verify the UE identity without the help of the MN in this step.

In Step S912, when the SN can resume one or more suspended RBs, the SN may send to the MN the SN RESUME REQUEST message or new message containing the Resume ID and short MAC-I to indicate that the UE wants to resume the RRC connection at the SN and to query whether the UE identity is valid or not. This message may also include the following possible radio resource configuration for the SN within the container based on the result in Step S910:

RB IDs (e.g. SRB or DRB ID) admitted and rejected by the SN
Updated RLC configuration
Updated Logical channel configuration.

In Step S914, on receiving the message from the SN, the authentication token may be calculated by the MN in the same way as the short MAC-I used in RRC connection re-establishment and allows the MN to verify the UE identity. The MN also may find the exact UE context based on the Resume ID. Then, the MN may check whether the suspended RBs in the MN can be resumed or not. The MN may configure radio resource based on information received in Step S912.

In Step S916, the MN may respond to the SN with the SN RESUME RESPONSE message or new message to indicate that the UE verification is successful and which RBs are resumed in the MN. This message may include the following updated radio resource configuration for the MN within the container:

RB IDs (e.g. SRB or DRB ID) admitted and rejected by the MN
Updated RLC configuration
Updated Logical channel configuration.

In Step S918, upon reception of the SN RESUME RESPONSE message, the SN may resume some or all suspended RBs based on the result in Step S910. In other words, the SN may configure radio resources based on radio resources configured by the MN.

Figure 10:
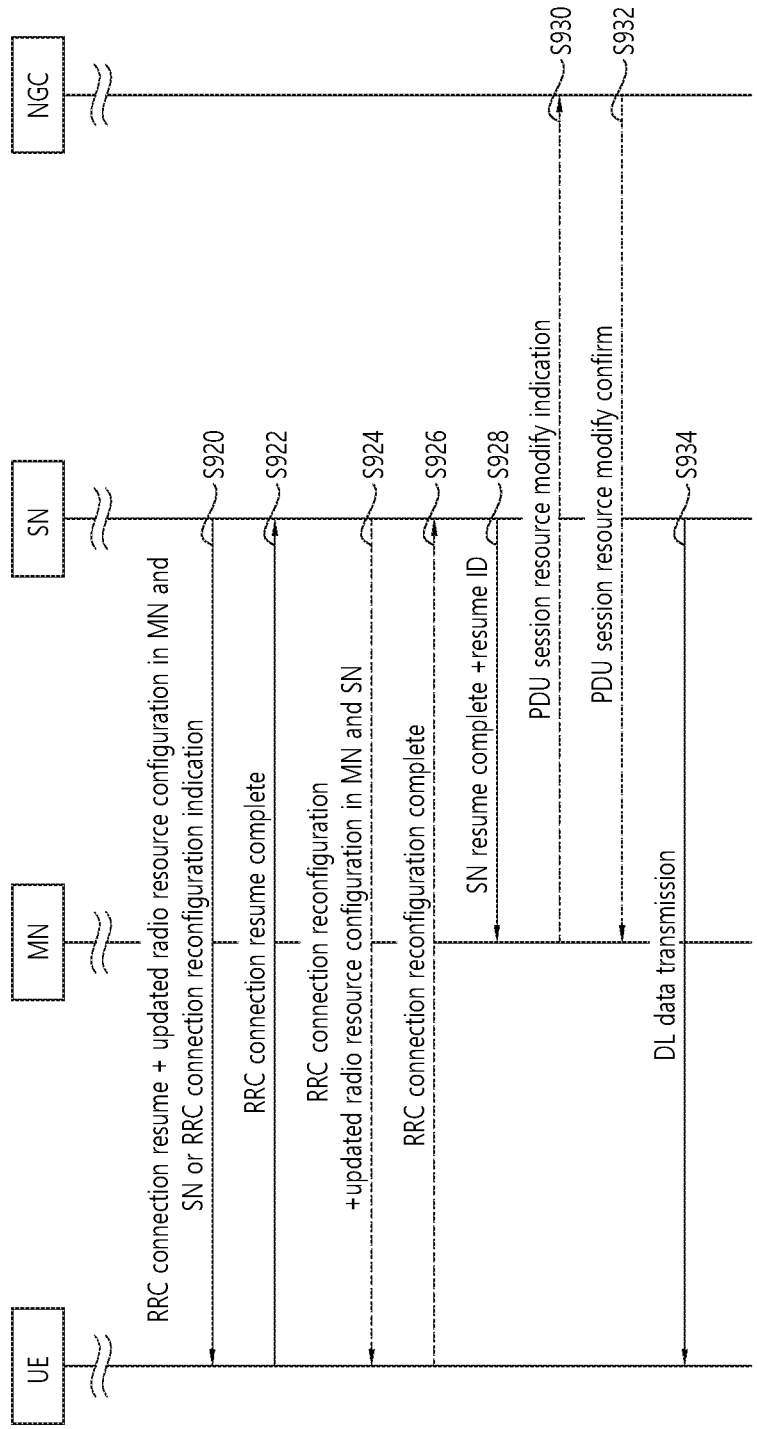
FIG. 10 shows an example of a method for performing RAN based paging according to an embodiment of the present invention.

The description will be continued with reference to FIG. 10.

FIG. 10 shows an example of a method for performing RAN based paging according to an embodiment of the present invention.

In Step S920, the SN may send to the UE the RRC CONNECTION RESUME message to indicate that the MN and SN can find the previously stored UE context based on the Resume ID and the authentication token is successfully validated. This message may also contain the updated radio resource configuration for the MN and SN or the RRC connection reconfiguration indication.

In Step S922, if the updated radio resource configuration for the MN and SN is included into the RRC CONNECTION RESUME message, the UE may need to modify the RRC connection (e.g., to establish/modify/release RBs) based on the updated configuration. If the RRC connection reconfiguration indication is included, the UE should wait for the SN to send the RRC CONNECTION RECONFIGURATION message to establish/modify/release RBs. The UE also re-establishes the AS security. The UE then responds to the SN with an RRC CONNECTION RESUME COMPLETE confirming that the RRC connection was resumed successfully.

In Step S924, if the RRC connection reconfiguration indication is included into the RRC CONNECTION RESUME message in Step S920, the SN may send to the UE the RRC CONNECTION RECONFIGURATION message or new message to change the radio resource configuration in the MN and SN.

In Step S926, on receiving the RRC CONNECTION RECONFIGURATION message from the SN, the UE may reconfigure its RBs based on the updated radio resource configuration for the MN and SN. Then, the UE may respond to the SN with the RRC CONNECTION RECONFIGURATION COMPLETE message or new message.

In Step S928, the SN may send to the MN the SN RESUME COMPLETE message or new message to indicate the successful completion of the RRC connection resumption.

In Step S930, if the SN fails to resume some suspended RBs, the MN updates the user plane path for the SN towards the NGC. In other words, the MN may transmit PDU session resource modify indication to NGC.

In Step S932, the NGC may transmit PDU session resource modify confirm in response to PDU session resource modify indication received in Step S930.

In Step S934, the SN may transmit the buffered data to the UE.

According to an embodiment of present invention, the SN may efficiently resume the RRC connection for the UE since the UE needs not to re-access to the MN to request the resumption of the RRC connection. In addition, the MN needs not to trigger the RRC Connection Reconfiguration procedure to modify/release the RBs for the MN since the SN already reconfigures the RBs for the MN and SN.

Figure 11:
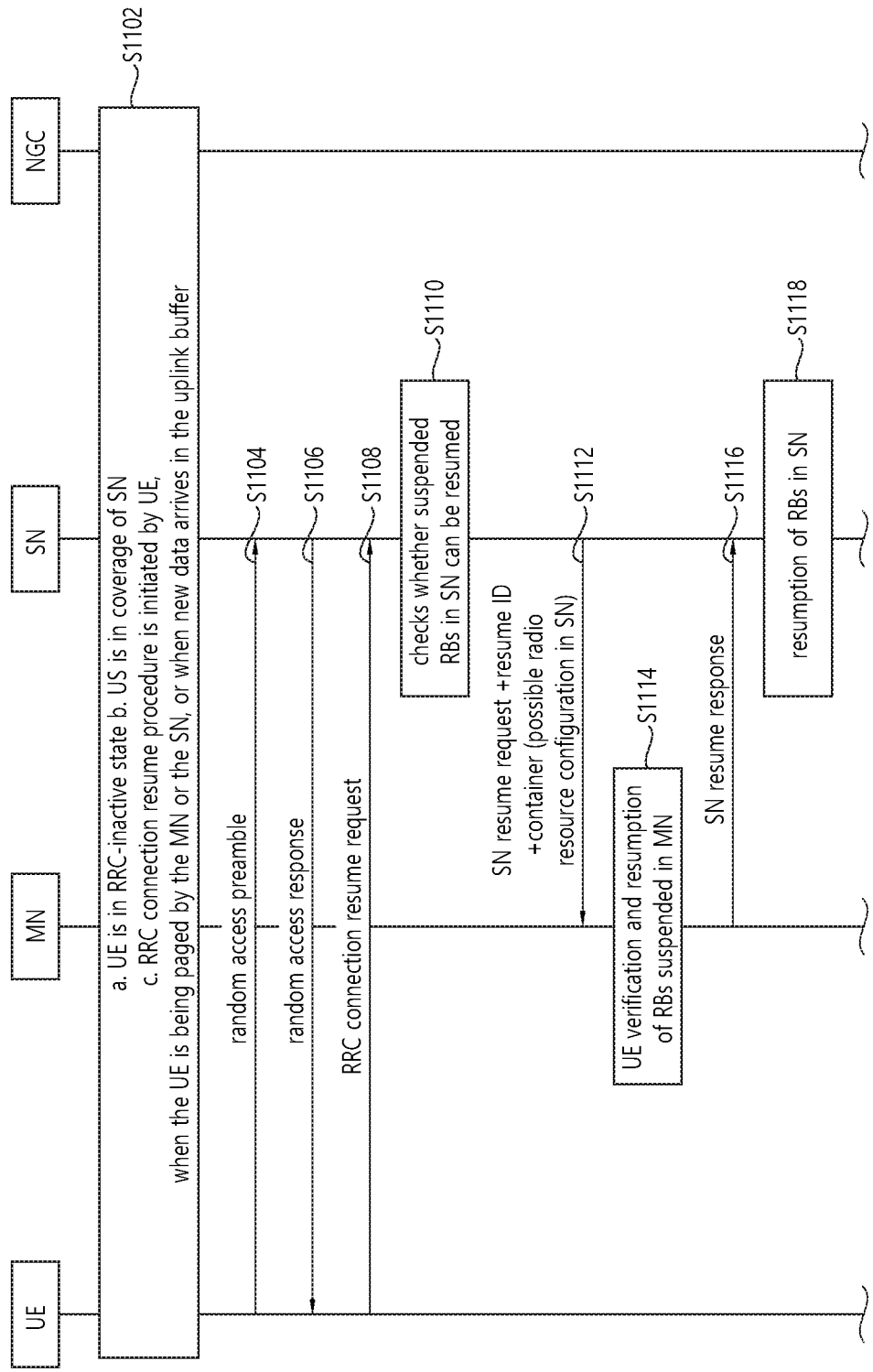
FIG. 11 shows an example of a method for performing RAN based paging according to an embodiment of the present invention.

FIG. 11 shows an example of a method for performing RAN paging according to an embodiment of the present invention. For the case where the UE needs to initiate the RRC Connection Resume procedure to the SN, the SN may ask to the MN whether to resume the RRC connection for that UE. In order to assist the UE verification in the MN, the SN also may send to the MN which suspended RBs in the SN can be resumed. After the UE verification, the MN also may indicate to the SN that the UE identity is valid. Based on this information, the SN may send to the UE that the resumption for the suspended RRC connection is permitted and the RBs for the MN, and SN needs to be reconfigured at the UE. After the successful resumption for the UE, the MN also may trigger the RRC Connection Reconfiguration procedure to modify/release the RBs for the MN.

Referring FIG. 11, a method for successful RRC connection resume to the SN in the MR-DC considering the RRC-INACTIVE state according to an embodiment of the present invention is described.

In step S1102, the UE may be in the RRC-INACTIVE state as an initial state. The control plane and user plane connection between the MN and NGC may be still maintained. Also, the user plane connection between the SN and NGC may be maintained. The UE may be located within the coverage of the SN. When the UE is being paged by the MN or the SN, or when new data arrives in the uplink buffer, the UE may initiate the UE triggered RRC Connection Resume procedure in order to resume the RRC connection.

In step S1104, when the UE in RRC-INACTIVE state needs to transit to the RRC-CONNECTED state, the UE may send the RANDOM ACCESS PREAMBLE message or new message to the SN.

In Step S1106, on receiving the message from the UE, the SN may respond with RANDOM ACCESS RESPONSE message to the UE.

In step S1108, in order to resume the RRC connection, the UE may send the RRC CONNECTION RESUME REQUEST message or new message to the SN. This message also may include the Resume ID and short MAC-I to identify the UE context in the SN and MN.

In Step S1110, when the SN successes to access the previously stored UE context based on the Resume ID, the SN may check whether the suspended RBs in the SN can be resumed or not. When the MN may provide the security information to calculate the authentication token during the UE's state transition from the RRC-CONNECTED to the RRC-INACTIVE, the SN may verify the UE identity without the help of the MN in this step.

In Step S1112, when the SN can resume one or more suspended RBs, the SN may send to the MN the SN RESUME REQUEST message or new message containing the Resume ID and short MAC-I to indicate that the UE wants to resume the RRC connection at the SN and to query whether the UE identity is valid or not. This message may also include the following possible radio resource configuration for the SN within the container based on the result in step S1110:

RB IDs (e.g. SRB or DRB ID) admitted and rejected by the SN
  Updated RLC configuration
  Updated Logical channel configuration.

In Step S1114, on receiving the message from the SN, the authentication token may be calculated by the MN in the same way as the short MAC-I used in RRC connection re-establishment and allows the MN to verify the UE identity. The MN also may find the exact UE context based on the Resume ID. Then, the MN may check whether the suspended RBs in the MN can be resumed or not.

In step S1116, the MN may respond to the SN with the SN RESUME RESPONSE message or new message to indicate that the UE verification is successful.

In step S1118, upon reception of the SN RESUME RESPONSE message, the SN may resumes some or all suspended RBs based on the result in Step S1110.

Figure 12:
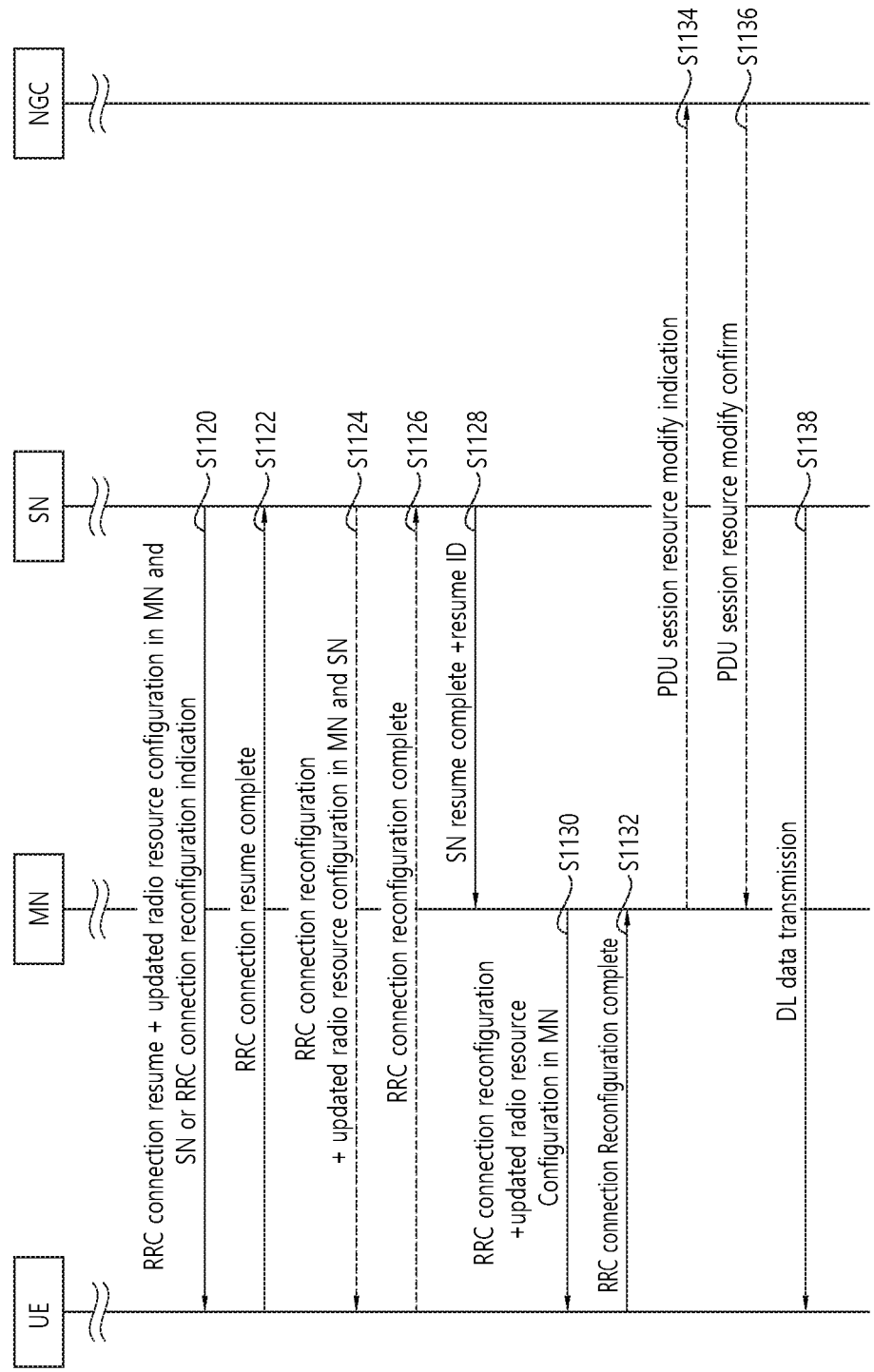
FIG. 12 shows an example of a method for performing RAN based paging according to an embodiment of the present invention.

The description will be continued with reference to FIG. 12.

FIG. 12 shows an example of a method for performing RAN based paging according to an embodiment of the present invention.

In step S1120, the SN may send to the UE the RRC CONNECTION RESUME message to indicate that the MN and SN can find the previously stored UE context based on the Resume ID and the authentication token is successfully validated. This message may also contain the updated radio resource configuration for the SN or the RRC connection reconfiguration indication.

In step S1122, if the updated radio resource configuration for the SN is included into the RRC CONNECTION RESUME message, the UE may need to modify the RRC connection (e.g., to establish/modify/release RBs) based on the updated configuration. If the RRC connection reconfiguration indication is included, the UE may wait for the SN to send the RRC CONNECTION RECONFIGURATION message to establish/modify/release RBs. The UE also may re-establish the AS security. The UE then may respond to the SN with an RRC CONNECTION RESUME COMPLETE confirming that the RRC connection was resumed successfully.

In Step S1124, if the RRC connection reconfiguration indication is included into the RRC CONNECTION RESUME message in Step S1120, the SN may send to the UE the RRC CONNECTION RECONFIGURATION message or new message to change the radio resource configuration in the SN.

In step S1126, on receiving the RRC CONNECTION RECONFIGURATION message from the SN, the UE may reconfigure its RBs based on the updated radio resource configuration for the SN. Then, the UE may respond to the SN with the RRC CONNECTION RECONFIGURATION COMPLETE message or new message.

In step S1128, the SN may send to the MN the SN RESUME COMPLETE message or new message to indicate the successful completion of the RRC connection resumption.

In step S1130, upon reception of the SN RESUME COMPLETE message, the MN may send to the UE the RRC CONNECTION RECONFIGURATION message or new message to change the radio resource configuration in the MN.

In step S1132, on receiving the RRC CONNECTION RECONFIGURATION message from the MN, the UE may reconfigure its RBs based on the updated radio resource configuration for the MN. Then, the UE may respond to the MN with the RRC CONNECTION RECONFIGURATION COMPLETE message or new message.

In Step S1134, if the SN fails to resume some suspended RBs, the MN updates the user plane path for the SN towards the NGC. In other words, the MN may transmit PDU session resource modify indication to NGC.

In Step S1136, the NGC may transmit PDU session resource modify confirm in response to PDU session resource modify indication received in step S1134.

In Step S1138, the SN may transmit the buffered data to the UE.

According to an embodiment of present invention, the SN may efficiently resume the RRC connection for the UE since the UE needs not to re-access to the MN to request the resumption of the RRC connection.

Figure 13:
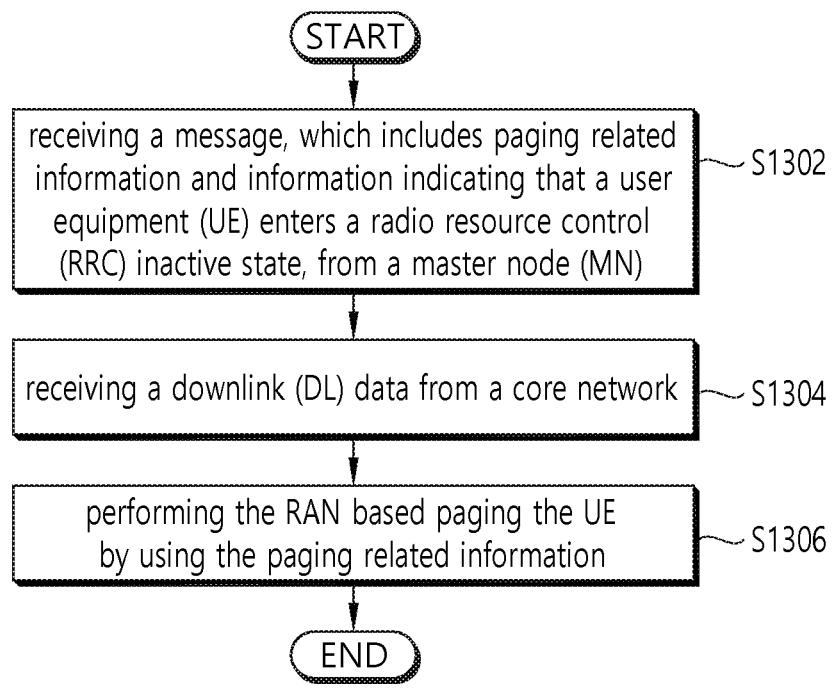
FIG. 13 is a flowchart illustrating a method of performing RAN based paging according to an embodiment of the present invention.

FIG. 13 is a flowchart illustrating a method of performing a RAN based paging according to an embodiment of the present invention. The steps of an embodiment of present invention may be performed by a secondary node (SN) in dual connectivity (DC).

In Step S1302, the SN may receive a message, which includes paging related information and information indicating that a user equipment (UE) enters a radio resource control (RRC) inactive state, from a master node (MN). The UE may be located in a coverage of the SN. The paging related information may include at least one of UE identity index value, UE paging identity, paging discontinuous reception (DRX), radio access network (RAN) paging area, paging priority and assistance data for paging. The paging related information includes a security information for a verification of the UE. In this case, the SN may verify the UE by using the security information, upon receiving the DL data from the core network.

In step S1304, the SN may receive a downlink (DL) data from a core network.

In step S1306, the SN may perform the paging for the UE by using the paging related information.

In this embodiment of present invention, a user plane connection between the core network and the SN may be maintained, while the UE is in RRC inactive state.

Further, a control plane connection and a user plane connection between the core network and the MN may be maintained, while the UE is in RRC inactive state Further, the SN may transmit a notification of the DL data to the MN.

Further, the SN may receiving a request for a RRC connection from the UE, when the UE is paged by the paging; configure radio resource for the RRC connection; and transmit resume request including information on the configured radio resources to the MN. The resume request may include at least one of signaling radio bearer (SRB) identity (ID) or data radio bearer (DRB) ID admitted and rejected by the SN, updated radio link control (RLC) configuration and updated logical channel configuration.

Further, the SN may receive a resume response including information on radio resource configured by the MN based on the resume request; and reconfigure the radio resource for the RRC connection. The resume response includes at least one of SRB ID or DRB ID admitted and rejected by the MN, updated RLC configuration and Updated Logical channel configuration.

Further, the SN may resume radio bearers based on the reconfigured radio resource.

Figure 14:
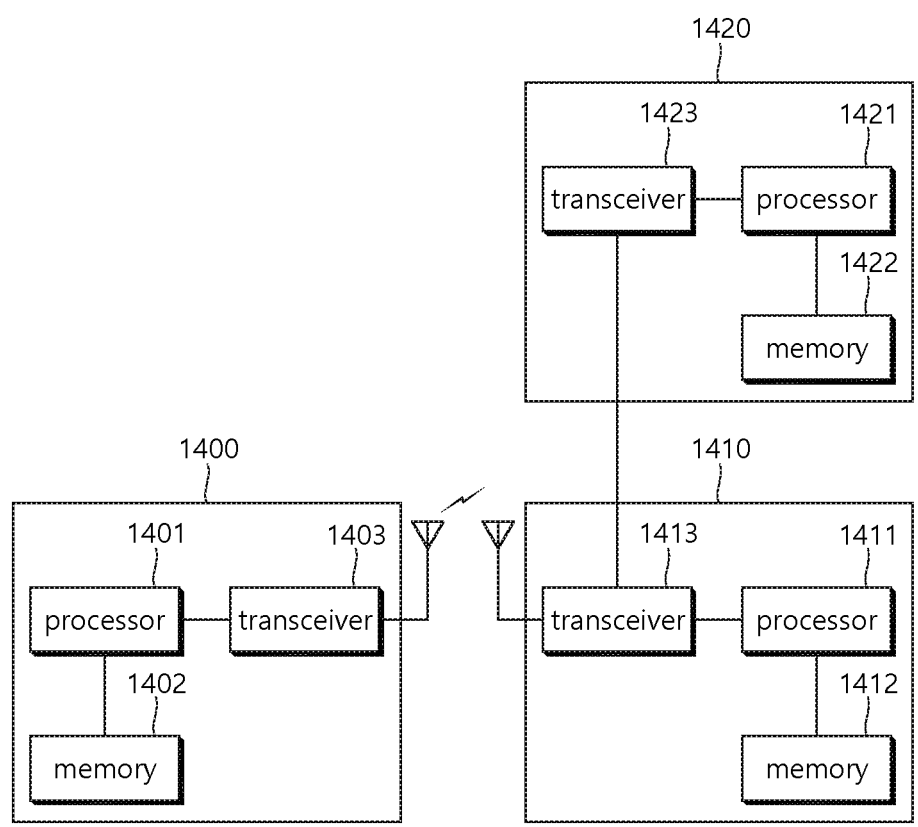
FIG. 14 shows a communication system to implement an embodiment of the present invention.

FIG. 14 shows a communication system to implement an embodiment of the present invention.

A first network node 1400 includes a processor 1401, a memory 1402, and a transceiver 1403. The memory 1402 is coupled to the processor 1401, and stores a variety of information for driving the processor 1401. The transceiver 1403 is coupled to the processor 1401, and transmits and/or receives a radio signal. The processor 1401 implements the proposed functions, procedures, and/or methods. In the aforementioned embodiments, an operation of the first network node may be implemented by the processor 1401.

A second network node 1410 includes a processor 1411, a memory 1412, and a transceiver 1413. The memory 1412 is coupled to the processor 1411, and stores a variety of information for driving the processor 1411. The transceiver 1413 is coupled to the processor 1411, and transmits and/or receives a radio signal. The processor 1411 implements the proposed functions, procedures, and/or methods. In the aforementioned embodiments, an operation of the second network node 1410 may be implemented by the processor 1411.

The processors 1411 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing, by a secondary node (SN) in dual connectivity (DC), a radio access network (RAN) based paging in a wireless communication system, the method comprising:

receiving, by the SN in DC, a message from a master node (MN) in DC, wherein the message includes (i) paging related information and (ii) information representing that a user equipment (UE) enters a radio resource control (RRC) inactive state, wherein while the UE is in the RRC inactive state, (i) a control plane connection and a user plane connection between the core network and the MN are maintained and (ii) a user plane connection between the core network and the SN is maintained;

receiving, by the SN in DC, a downlink (DL) data from a core network; and based on receiving the DL data from the core network, and based on the information representing that the UE enters the RRC inactive state: performing the RAN based paging for the UE based on the paging related information that was received in the message from the MN.

2. The method of claim 1, wherein the UE is located in a coverage of the SN.

3. The method of claim 1, wherein the paging related information includes at least one of UE identity index value, UE paging identity, paging discontinuous reception (DRX), radio access network (RAN) paging area, paging priority, or assistance data for paging.

4. The method of claim 1, further comprising:
transmitting a notification of the DL data to the MN.

5. The method of claim 1, wherein the paging related information includes a security information for a verification of the UE.

6. The method of claim 5, further comprising:
verifying the UE based on the security information, upon receiving the DL data from the core network.

7. The method of claim 1, further comprising:
receiving a request for a RRC connection from the UE, based on the UE which is paged by the paging;
configuring radio resource for the RRC connection; and
transmitting resume request including information regarding the configured radio resources to the MN.

8. The method of claim 7, wherein the resume request includes at least one of signaling radio bearer (SRB) identity (ID), data radio bearer (DRB) ID, updated radio link control (RLC) configuration, or updated logical channel configuration,
wherein the SRB ID and the DRB ID are admitted and rejected by the SN.

9. The method of claim 7, further comprising:
receiving a resume response including information regarding radio resource configured by the MN based on the resume request; and
reconfiguring the radio resource for the RRC connection.

10. The method of claim 9, wherein the resume response includes at least one of SRB ID, updated RLC configuration, or Updated Logical channel configuration,
wherein the SRB ID and the DRB ID are admitted and rejected by the MN.

11. The method of claim 9, further comprising:
resuming radio bearers based on the reconfigured radio resource.

12. A secondary node (SN) configured to operate in dual connectivity (DC) in a wireless communication system, the SN comprising:
a transceiver; and
a processor coupled to the transceiver and configured to perform operations comprising:
receiving, by the SN in DC, a message from a master node (MN) in DC, wherein the message includes (i) paging related information and (ii) information representing that a user equipment (UE) enters a radio resource control (RRC) inactive state,
wherein while the UE is in the RRC inactive state, (i) a control plane connection and a user plane connection between the core network and the MN are maintained and (ii) a user plane connection between the core network and the SN is maintained;
receiving, by the SN in DC, a downlink (DL) data from a core network; and
based on receiving the DL data from the core network, and based on the information representing that the UE enters the RRC inactive state: performing a radio access network (RAN) based paging for the UE based on the paging related information that was received in the message from the MN.

13. The method of claim 1, wherein the UE is in communication with at least one of a mobile device, a network, or autonomous vehicles other than the UE.

* * * * *